May 15, 1923. 1,455,619
J. JOHNSON
BRAKE OPERATING MECHANISM FOR VEHICLES
Filed March 2, 1921 2 Sheets-Sheet 1
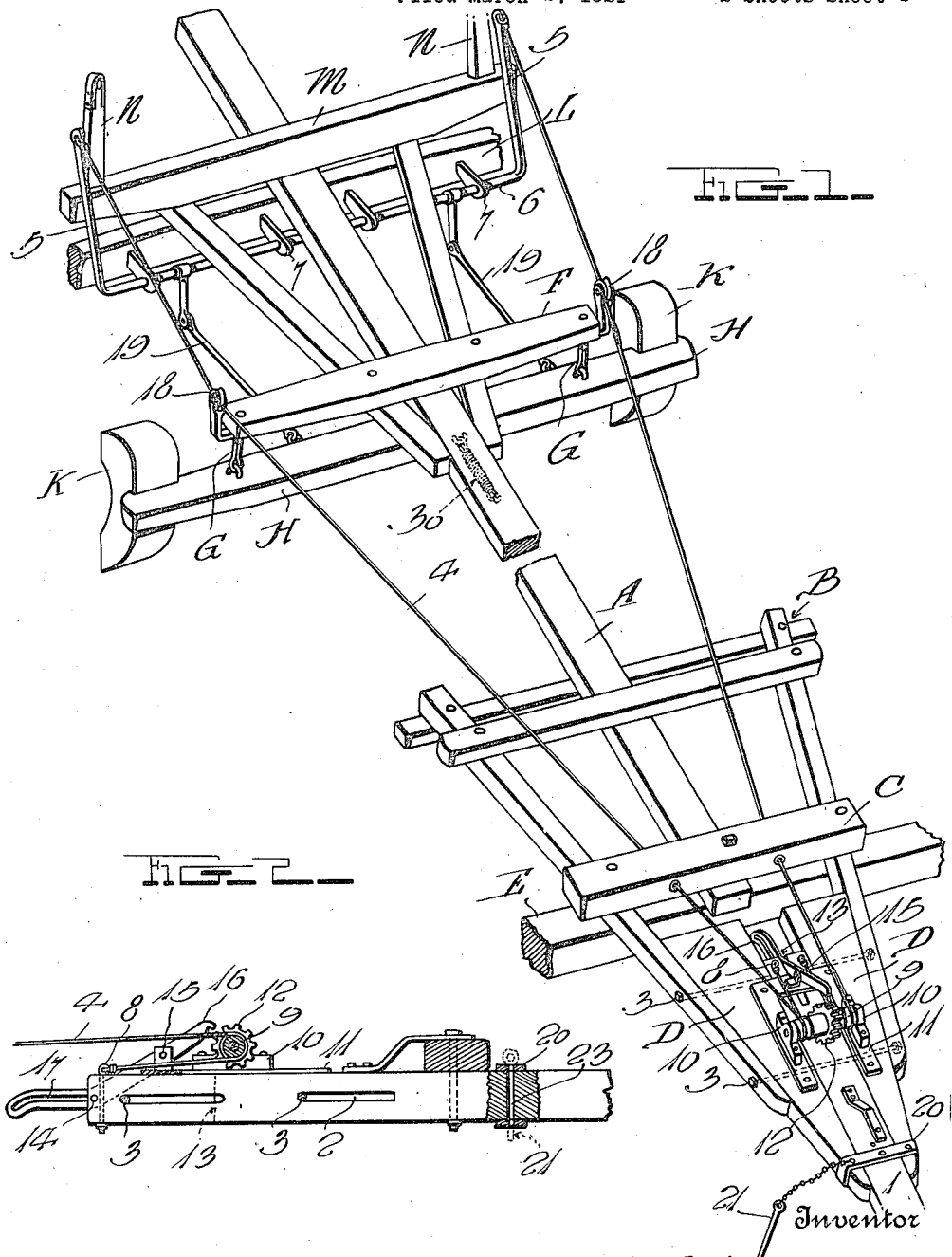
Witness
H. Woodard
Inventor
J. Johnson
By H. R. Willson &co.
Attorneys

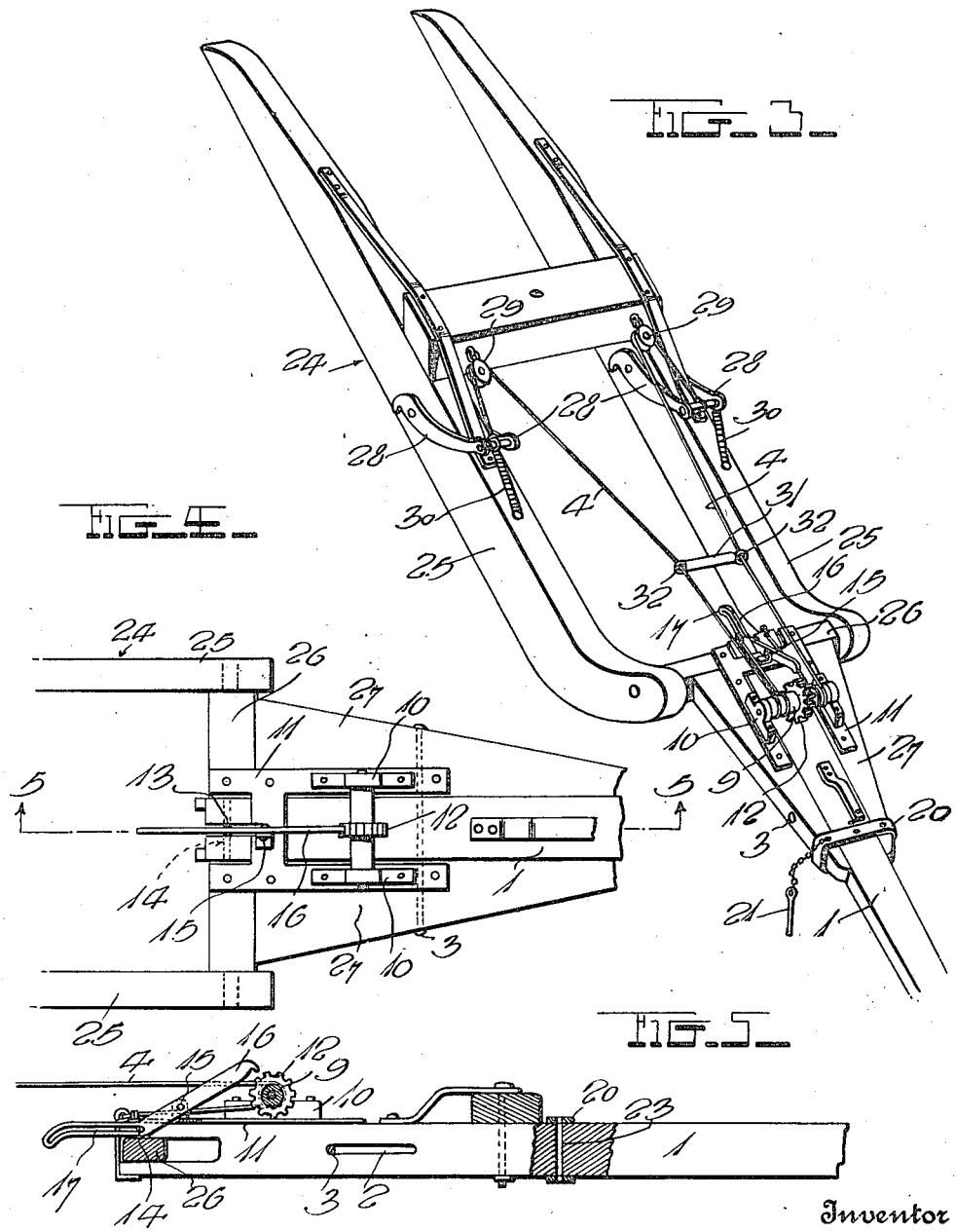

Patented May 15, 1923.

1,455,619

UNITED STATES PATENT OFFICE.

JOE JOHNSON, OF ENTERPRISE, OREGON, ASSIGNOR OF ONE-HALF TO J. A. BURLEIGH, OF ENTERPRISE, OREGON.

BRAKE-OPERATING MECHANISM FOR VEHICLES.

Application filed March 2, 1921. Serial No. 448,966.

*To all whom it may concern:*

Be it known that I, JOE JOHNSON, a citizen of the United States, residing at Enterprise, in the county of Wallowa and State of Oregon, have invented certain new and useful Improvements in Brake-Operating Mechanism for Vehicles; and I do declare the following to be a full, clear, and exact description of the invention, such as will enable others skilled in the art to which it appertains to make and use the same.

This invention relates to an improved brake operating mechanism for vehicles, being especially, although not necessarily, designed for use in connection with wagons, sleighs, and other horse-drawn vehicles.

The principal object of the invention is to provide a simple and novel structure for use in connection with a sliding tongue on the vehicle, the parts being so associated with one another and the brake, as to automatically apply the latter when the tongue is moved rearwardly such as it is when the horses "back-up" on a down grade. Thus, unnecessary strains are taken off of the animals and the tendency of the vehicle to overrun them is entirely overcome.

Another and important object of the invention is to generally improve upon devices of this class by the provision of one of extreme simplicity and durability which is positive in operation, applicable to conventional types of wagons and sleighs without altering the latter in any way whatsoever, the parts being employed in the make-up of the device being reduced to a minimum and the device thus rendered comparatively inexpensive to both the manufacturer and the user.

A still further object of the invention is to provide a brake operating device which is rendered novel by the employment of means simultaneously limiting the rearward movement of the tongue and locking the brake until a forward pull is exerted on the tongue.

Still another object of the invention is to provide a novel brake operating device which embodies the above features together with means for preventing sliding movement of the tongue and rendering the device inoperative whenever desired or necessary.

Other objects and advantages of the invention will be apparent during the course of the following description.

In the accompanying drawings forming a part of this specification and in which like numerals are employed to designate like parts throughout the same:

Figure 1 is a perspective view of a conventional type of running-gear used in connection with wagons, showing my improved brake operating device or mechanism associated therewith.

Figure 2 is a sectional view taken on the plane of the line 2—2 of Fig. 1.

Figure 3 is a perspective view of the supporting structure for a sleigh showing the improved brake operating mechanism associated therewith.

Figure 4 is a top plan view of the forward portion of the structure shown in Fig. 3 with parts removed.

Figure 5 is a sectional view taken on the plane of the line 5—5 of Fig. 4, looking in the direction of the arrows.

In the drawings I have shown my improved brake operating device or mechanism as being used in connection with the running-gear of a conventional type of wagon (Figs. 1 and 2), and have also disclosed the same mechanism used in connection with the supporting structure or running-gear for sleighs (Figs. 3 to 5). The mechanism disclosed in Figs. 1 and 2 is identical with that disclosed in the remaining figures. Therefore, the same reference characters will be used in describing this mechanism for all the figures of the drawings.

Referring first to Figs. 1 and 2, it will be seen, that as before stated, I have disclosed the running-gear of a wagon such as is in use at this time. The structure herein shown is generally well known to persons skilled in this art and for this reason, a brief description of the running gear will suffice. To this end, the letter A designates the reach-pole or bar, on the forward end of which a swinging frame B is pivoted, this frame including among other parts, a sand-bar C and spaced fore-hounds D. An axle E serves to support these parts. Near the intermediate portion of the reach-bar is a hanger or cross-piece F and this element, through the medium of linkage G, supports the brake-beam H. At the opposite end of the brake-beam H are the usual brake shoes K. Among other parts seen at this end of the running-gear, is the rear axle L, bolster M and standards N. All of these parts, as is obvious, are well known and constitute no part of this invention.

The invention resides in the employment of a sliding tongue 1 which is positioned between the fore-hounds D, being provided at this end with elongated slots 2 through which the fastening bolts 3 pass in the manner shown, this construction permitting free sliding of the tongue and serving, if necessary, to limit the sliding movement thereof in opposite directions. Broadly speaking, there is means between this tongue and the brake for operating the latter when the tongue is moved rearwardly, such movement of the tongue occurring when the horses "back-up" on a down-grade in the path of travel. More specifically described, the means for accomplishing this result is preferably in the form of a pair of cables 4 which are attached at their rear ends to crank-arms 5 on a rock shaft 6, the latter being rotatably mounted in bearings 7 carried by the rear axle. At their opposite ends, the cables are preferably connected to eye-bolts 8 secured to the rear end of the tongue and near this end, they bend over, or better say, are wrapped about a rotary drum or shaft 9. This shaft as shown is journalled in bearings 10 carried by the U-shaped bracket 11 which is permanently secured to the hounds D, and it carries a gear or ratchet 12 which serves a purpose to be hereinafter described. At this point, I may state that the sand-bar C is provided with metal lined transverse guide openings and the cables are passed through these guide openings so as to insure proper co-operation with the drum 9. At its rear end, the tongue is provided with a notch 13 and driven transversely through the tongue so as to cross this notch is a pin or the like 14. Arranged in this notch and pivoted at 15 on the bracket 11 is a dog 16, the same being formed with an elongated slot 17 through which the aforesaid pin 14 extends. It is to be noted that the forward portion of the slot 17 is substantially straight while the rear end thereof is curved so that when the pin 14 engages this curved part, the dog will be rocked on its pivot and engaged with the gear 12, thus preventing further rotation of the drum and limiting further rearward movement of the tongue. Intermediate their ends, the cables 4 pass beneath guide pulleys 18 and when they are drawn forwardly as the tongue is moved rearwardly, the brake shoes K are brought into engagement with the wheels, this result being accomplished by the linkage 19 between the rock shaft 6 and brake beam H.

It oftentimes happens that it is found desirable to render the brake operating device inoperative and, as before stated, I provide a novel means for accomplishing this result. This means comprises an apertured band 20 secured to the forward ends of the hounds and surrounding the tongue, and a locking pin 21, the aperture in the band being adapted to be alined with the aperture 23 in the tongue to permit the locking pin 21 to be passed through these apertures to prevent sliding movement of the tongue.

Referring now to Figs. 3 to 5, it will be seen that my improved brake operating device is identical with that already shown and described and the same reference numerals are therefore employed. In these figures, I have disclosed a conventional type of supporting structure for sleigh bodies, this body being here indicated by the numeral 24 and as seen, including the usual spaced runners 25 and pivoted cross-piece 26 at its front end. It is to this cross-piece that the spaced hounds 27 are connected and between these hounds that the tongue 1 is slidably mounted in the way already described. The brakes here shown are in the form of pairs of spaced levers 28 arranged on opposite sides of the runners in a position to engage the ice over which the sleigh is drawn. These brake levers are connected together in any suitable way and the rear ends of the operating cables 4 are directly connected therewith, the cables being passed through pulleys 29. At this point, I may direct attention to the fact that in both forms of supporting structures, coiled springs 30 are employed for the purpose of taking up slack in the cables. A different type of guide member 31 is here employed, the same consisting of a bar with guide eyes 32 at its opposite ends for passage of the cables to insure effective winding thereof on the drum.

It is thought that the foregoing description taken in connection with the drawings is sufficient to enable persons skilled in the art to which the invention relates to obtain a clear understanding of the construction and arrangement of parts, and the operation thereof. However, a brief review of the operation may well serve at this point. To this end, it will be seen that when the tongue 1 is moved rearwardly between the spaced hounds, a forward pull will be exerted on the cables 4 and rotation will be imparted to the drum 9. Such action of the cables will cause the brakes to be automatically applied. When the tongue is moving in this direction, the pin 14 rides in the straight part of the slot 17 of the dog and does not effect the latter until this pin reaches the curved part of the slot, where it imparts a rocking movement to the dog and causes the latter to engage the gear 12. Further rotation of the drum is then stopped and further rearward movement of the tongue is simultaneously stopped and the brakes held applied in this way until a forward pull is exerted on the tongue. If, as before stated, it is desired to retain the operating device ineffective, this may be done by simply alining the aperture 23 in the tongue with the aperture in the band 20 and passing the locking pin 21 through these apertures in the manner disclosed.

While I have shown and described a particular type of drum for co-operation with the cables, I wish it to be understood that a stationary shaft could be employed instead of this rotary element. However, by employing the construction specifically described, excessive wear of the cables is prevented. Furthermore, while I have shown my improved brake operating mechanism used in connection with the running-gear for wagon and sleighs, I wish it to be understood that it may be equally well used in connection with other types of vehicles. The several advantages and features of the invention have, no doubt, become apparent from the foregoing description and drawings. For this reason, a more lengthy description is deemed unnecessary. Since probably the best results may be obtained with the construction and arrangement herein shown and described, this construction and arrangement is taken as the preferred embodiment of the invention. However, minor changes may be made within the scope of the invention as claimed.

I claim:

1. Brake operating mechanism embodying a tongue to be slidably mounted on a vehicle, a rotary drum mounted on the vehicle for cooperation with the tongue, a brake operating cable passing over the drum and connected with the inner end of the tongue, and means controlled by the rearward sliding movement of the tongue for limiting said sliding movement and for locking the drum against further rotation at this time.

2. Brake operating mechanism comprising a tongue designed to be slidably mounted on the vehicle hounds, a rotary drum rigidly mounted on said hounds adjacent the inner end of said tongue, a gear on said drum, and a dog for coaction with the gear to prevent rotation of the drum, said dog being operated by the rearward sliding movement of said tongue.

3. The structure set forth in claim 2 together with coacting means between the tongue and dog for engaging the latter with the gear when the tongue has been moved rearwardly a predetermined distance and the brakes have been applied.

4. Brake operating means comprising a tongue adapted to be slidably mounted between the usual hounds on a vehicle, bearings on said hounds, a shaft journaled in the bearings and extending cross-wise of the rear end portion of the tongue, a gear carried by said shaft, a cable connected at one end to the rear end of the tongue, said cable being wrapped around the shaft and acting on the brake, and a locking dog cooperative with the gear, said dog being rendered effective when the tongues move rearwardly a predetermined distance.

5. Brake operating means comprising a tongue adapted to be slidably mounted between the usual hounds on a vehicle, said tongue having a notch formed in its rear end, a pin secured to the tongue and extending across the notch, a bracket secured on the hounds, a drum rotatably mounted on the bracket, a gear carried by the drum, a dog pivoted on the bracket and extending through the notch and having a cam-slot through which said pin extends so that the dog will be rocked on its pivot when the tongue is moved rearwardly and will automatically engage the gear, and a cable connected to the tongue, being wrapped about the drum and acting on said brake when the tongue moves rearwardly.

In testimony whereof I have hereunto set my hand.

JOE JOHNSON.